METHOD OF MANUFACTURING MATRIX ARRANGEMENT

Filed March 8, 1966 3 Sheets-Sheet 1

INVENTOR.
HANS HOFFMANN
BY
Frank R. Trifari
AGENT

INVENTOR.
HANS HOFFMANN
BY
Frank R. Trifari
AGENT

INVENTOR.
HANS HOFFMANN
BY
Frank R. Trifari
AGENT

United States Patent Office 3,520,052
Patented July 14, 1970

3,520,052

METHOD OF MANUFACTURING MATRIX ARRANGEMENTS

Hans Hoffmann, Friedrichsgabe Post, Harksheide, Germany, assignor, by mesne assignments, to U.S. Philips Corporation, New York, N.Y., a corporation of Delaware Filed Mar. 8, 1966, Ser. No. 532,698
Claims priority, application Germany, Mar. 19, 1965, P 36,321
Int. Cl. H01j 7/06
U.S. Cl. 29—604 15 Claims

ABSTRACT OF THE DISCLOSURE

A method of manufacturing a magnetic storage matrix including the steps of providing a raster of grooves on a silicon substrate, plating magnetic material and insulated conductors into grooves, and providing islands of excitation elements around the outer edge of the substrate to permit integrated drivers to be assembled with the matrix.

Figure 1:
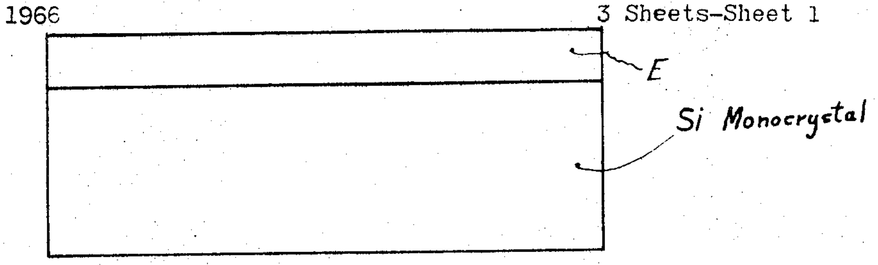

The invention relates to a method of manufacturing matrix arrangements used for magnetic storage of information, for example, in electronic calculating systems.

In known storage arrangements, use is made, for example, of annular magnetic cores having a rectangular hysteresis loop. In dependence upon the condition whether the core is magnetized in the righthand or in the lefthand direction, that is to say whether the core is in the positive or in the negative remanence state, the stored information is either an "O" or an "L." These cores are threaded in rows and columns so as to form a magnet core matrix. In the usual arrangements, four wires pass through each core, that is to say in the X-direction, in the Y-direction and in the diagonal directions of the matrix. However, it is very difficult and time-consuming to thread the cores so as to form a matrix. This process cannot be readily simplified either. The price of such a matrix is correspondingly high. Moreover, the percentages of reject due to damages to the annular cores involved in threading the wires is comparatively high. If high-speed storage devices should be obtained, the individual storage cores must be chosen to be accordingly small so that mounting becomes even more difficult. The possibility of increasing the switching current, a step by which the change-over of this core is also accelerated, is limited by the power of the electronic excitation apparatus and by the signal to noise ratio.

A matrix in the form of a perforated ferrite plate is also known. Perforations are pierced in a plate consisting of ferrite having a rectangular hysteresis loop and obtained by the usual moulding and sintering method, through which perforations the required current conductors must be threaded. This matrix arrangement is considerably more robust when compared with the usual wiring process and permits also at least part of the wiring of being printed by photographic means. The perforations may be chosen smaller so that the required switching current for the magnetic change-over of the surrounding of the perforations decreases. However, in order to obtain unambiguous output voltage, the perforations must be provided with great accuracy so that such a piercing tool becomes very expensive.

A method in which the attempts are made to provide ferrite beads on the crossings of a wiring system by sintering is unserviceable, since at the sintering temperature of 1300° C. the insulation of the current conductors is destroyed. Attempts have been made to avoid the necessity of aftersintering in that a ferrite layer in melted state is applied to the crossing of the wiring system by spraying and/or by deposition from the gas phase. However, this method has not become of practical use.

Further methods seeming suitable for use in mass production are those of the so-called "laminated ferrite"-storage device and of the "flute" storage device. The "laminated ferrite" storage device is built up of individual layers of a viscous ferrite paste provided on a glass substratum. This ferrite paste has a raster of parallel lines of metal powder. If two such wafers are stacked so that the rasters are orthogonal while a ferrite disc is interposed for insulation purposes, the wafers can be compressed and be sintered together so as to form a matrix. In the case of the "flute" storage device, the two orthogonal wiring systems are likewise electrically insulated from each other by means of a ferrite layer. In one embodiment, a ferrite cylinder is pressed around a conductor system having a thermoplastic sleeve. The second conductor system perpendicularly passes through the ferrite cylinder. During sintering, the thermoplastic insulation flows away so that space becomes available for the shrinkage resulting from the sintering. Both methods solely permit of utilizing the array of the word address system. Thus, the required electronic excitation apparatus for a comparatively large storage device becomes complicated and expensive.

Another also known form of a matrix is that of the waffle-iron storage device. In this storage device, a ferrite plate obtained by the usual moulding and sintering method has milled into it a raster corresponding with the wiring in a ferrite core storage device. The relatively insulated current conductors are disposed in these grooves and the polished surface of this ferrite body is covered with a thin layer of square-loop magnetic material. The air gap between the ferrite body and this covering layer must be kept sufficiently small. The information is stored in the magnetic covering layer; the ferrite body should provide for a low resistance to the magnetic flux. This method has not yet passed the initial stage. A greater disadvantage is that the surfaces must be processed with great accuracy and that an air gap cannot be completely avoided. All the methods known hitherto further have the disadvantage that the wiring of the electronic excitation apparatus and this apparatus itself must still be manufactured. Moreover, the unavoidable comparatively long supply conductors of the electronic excitation apparatus are disadvantageous.

The invention relates to a method of manufacturing a magnetic storage matrix in which the disadvantages and the difficulties in manufacture of the said arrangements and methods are avoided and which permits an economical manufacture of matrix arrangements requiring only low switching currents. The storage devices obtained by this method are distinguished as a small and compact structure part.

The new method is characterized in that at the edges of a wafer of semi-conductor material, for example, of silicon, provision is made of insulating islands in which the excitation members required such as transistors and diodes required for the storage cells are accommodated, while the surface surrounded by these members is provided with a raster of grooves in which an insulating layer preferably consisting of silica is applied which is coated with magnetic materials so that the surface of these grooves is coated on all sides with the magnetic layer to which a further insulating layer preferably consisting of silica is applied, which latter layer has applied to it conductor paths and/or resistance paths by deposition from the vapour phase and/or by spraying, that is to say in several layers alternating with the insulating substance, while the upper layer is again coated with magnetic material.

Thus, storage elements and conductor systems are obtained which are excited by means of semi-conductor structural elements, preferably transistors and diodes, which are formed at the periphery of this storage matrix in the same semi-conductor wafer. In this method, it is no longer necessary to heat the matrix conductor array at high temperatures so that the insulation of the wires or even the wires themselves are not liable to be damaged, Moreover, the individual storage cells no longer contain an excess of magnetic material. The switching time is favourably affected and the switching current remains low. The deposition from the vapour phase of magnetic substances on surfaces is known per se and no longer involves particular practical difficulties. The application of melted metals or ceramic substances to any substrata by spraying is also known per se and has already been introduced in technology for certain uses. For example, copper layers are applied to ceramic surfaces and zinc layers to the surfaces of paper capacitors by spraying. If carried out in a suitable manner, this method permits of obtaining surprisingly compact homogeneous layers although the sprayed substrata are heated only comparatively slightly.

In comparison with a plate moulded out of ferrite powder, the density of a ferrite mass applied by spraying is so great that an internal de-magnetisation due to pores substantially does not occur. The requirements with respect to magnetic storage and switching are also fulfilled. Apart from ferrite, the magnetic material may consist of nickel-iron alloys in which a rectangular hysteresis loop is obtained, for example, due to magnetic field cooling. Alternatively, the storage material may consist of magnetisable layers which are deposited in vacuo from the vapour phase.

It is also known to apply metals to any substrata of silicium oxides by spraying or by deposition from the vapour phase and this method has proved satisfactory. For example, gold, aluminium, nickel-chromium and tantalum are already applied to silicium oxides in the semi-conductor technology. Apart from nickel-iron-cobalt alloys in which, for example, due to magnetic field cooling a rectangular hysteresis loop is obtained, ferrite applied by spraying is also suitable.

Examples of the method are described more fully with reference to the figures of the drawings.

Figure 2:
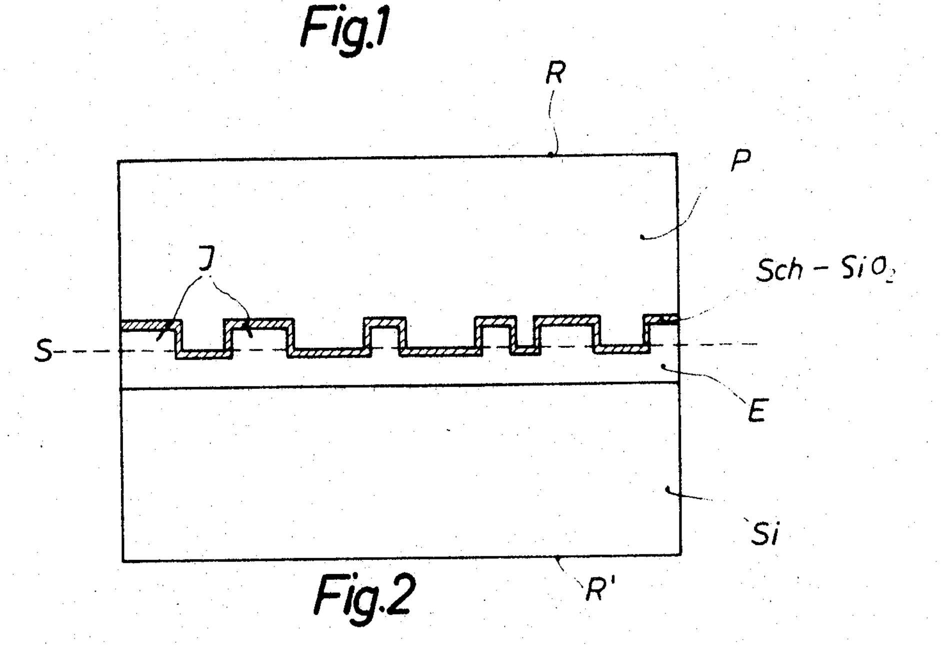
Figure 3:
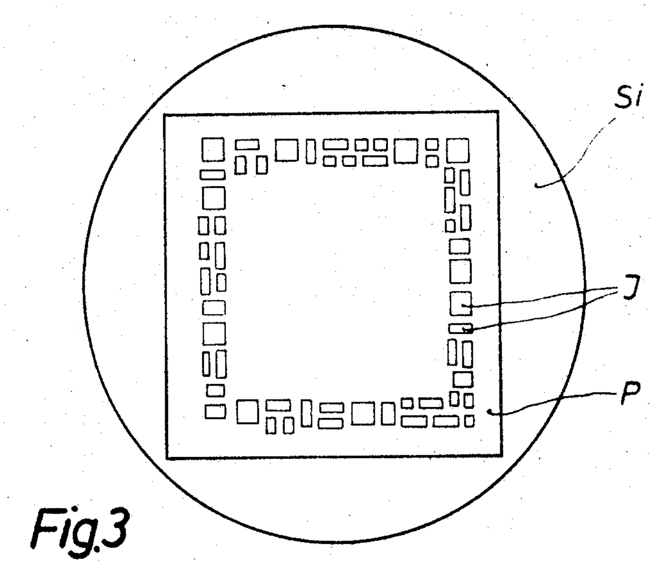

In FIG. 1, a layer E is grown, epitaxially onto a wafer Si of semi-conductor material, preferably of silicon, at the dotage used as starting substance for the excitation elements, for example, diodes and transistors. The layer is now removed as far as the areas to be occupied later by the excitation eleemnts by photoresist agency or similar methods and is coated with an insulating layer *Sch*, for example, of silicon oxide (FIG. 2). This layer *Sch* has grown onto it a polycrystalline layer P and the back side R' is removed by grinding as far as S so that a semi-conductor wafer is obtained which has insulating islands I for the formation of the excitation elements while the remaining part is coated with oxide. Fig. 3 shows diagrammatically the semi-conductor wafer. The formation of such insulating islands is known per se and is utilized in the manufacture of integrated circuits.

Figure 4:
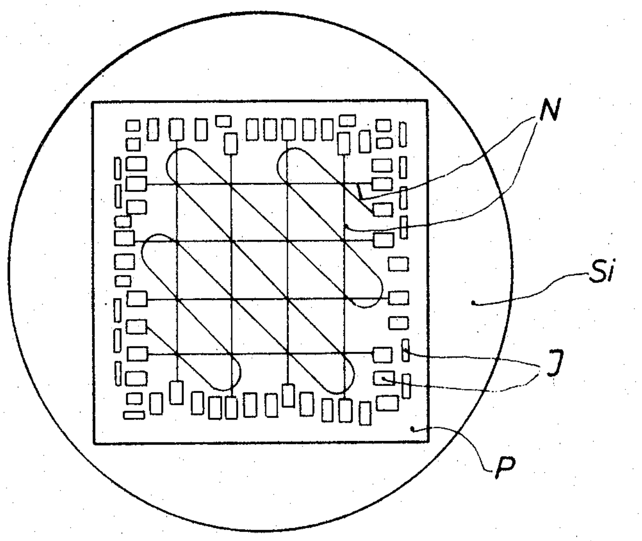
Figure 5:
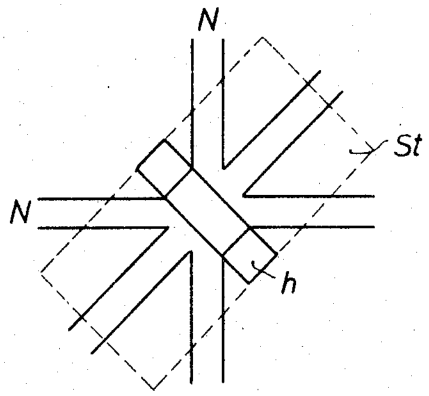
Figure 6:
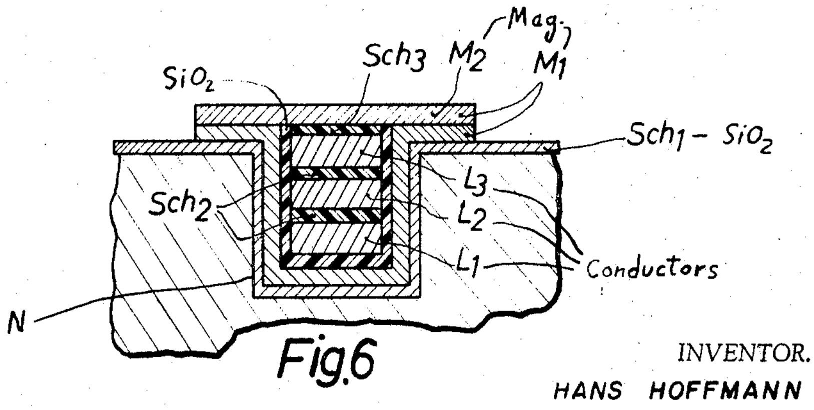

According to the known method of the planar technology, the excitation elements required for the storage cells are formed in these islands. After the formation of the excitation elements, grooves N are etched in the semi-conductor material P, for example, by photoresist agency (FIG. 4) and the individual crossings of the grooves may have approximately the form shown in FIG. 5. After etching of the grooves, the surface of the semi-conductor wafer is oxidized and at least at the areas *St* of FIG. 5 a magnetic layer M1 of ferrite or other magnetic materials such as nickel-iron alloys having a rectangular hysteresis loop is applied by spraying or by deposition from the vapour phase so that the surface of the grooves N is coated entirely as far as its edges or beyond its edges as far as the areas *h* of FIG. 5. Subsequently, the whole wafer is coated with an insulating layer *Sch*1 consisting preferably of silica. A layer of aluminium or gold or similar material is then applied by deposition from the vapour phase or by spraying and is removed by etching with the aid of photoresist agency so that the desired conductor paths L1, for example, the conductors extending in the X-direction, are formed (FIG. 6). Alternatively, these conductor paths may be obtained by the application of masks by spraying or by deposition from the vapour phase. In case resistors are required, it is possible to use tantalum or nickel-chromium instead of aluminium or gold. Subsequently, these conductor paths L1 are again electrically insulated from the remaining elements by the application of an insulating layer *Sch*2 and the following conductor paths extending, for example, in the Y-direction, are applied. If this process is repeated several times, a stack of several relatively insulated conductor paths is obtained (FIG. 6). After the desired number of conductor paths has been applied (the depth of the grooves corresponding with this number), as shown diagrammatically in FIGS. 5 and 6, again a magnetic layer M2 is applied. If the magnetic layer projecting beyond the grooves is etched so as to be free from the insulating layer *Sch*3, the last applied magnetic layer M2 can be connected with the layer M1 with a sufficiently small air gap.

The arrangement can be constructed so that either the layer M1 or the layer M2 or both the layers M1 and M2 consist of a material having a rectangular hysteresis loop. The information can be once stored in the magnetic layer M1. The layer M2 then decreases the magnetic resistance to the magnetic flux. If the layer M2 is stored, the layer M1 must have a negligible magnetic resistance. If both the layer M1 and the layer M2 have a rectangular hysteresis loop, the properties obtained are the same as those of an annular core. In all cases, it must be ensured that the edges of the magnetic layers adjoin each other closely in mechanical respect and that any air gap formed is kept sufficiently small.

If the information is stored in the layer M2, the geometrical dimensions of the layer M1 are not critical. At its crossings this layer must only be sufficiently large so as to form with the layer M2 the desired magnetic shunt. The geometrical dimensions of the layer M2, the storage element proper, must be maintained accurately, however, with a view to the manufacturing methods used.

Figure 7:
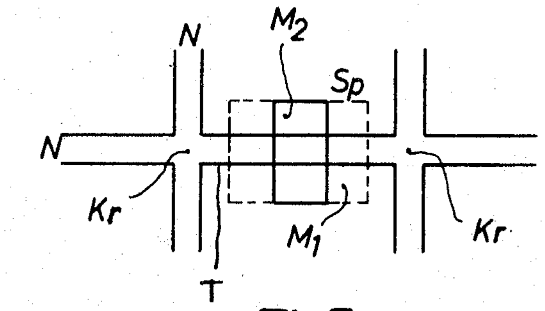

In the example described, the individual storage elements are located at the crossings of the grooves. An embodiment is also imaginable in which the storage elements *Sp* are located in the groove neck T between the crossings *Kr*, as indicated in FIG. 7, M1 and M2 corresponding with the magnetic layers described.

Figure 8:
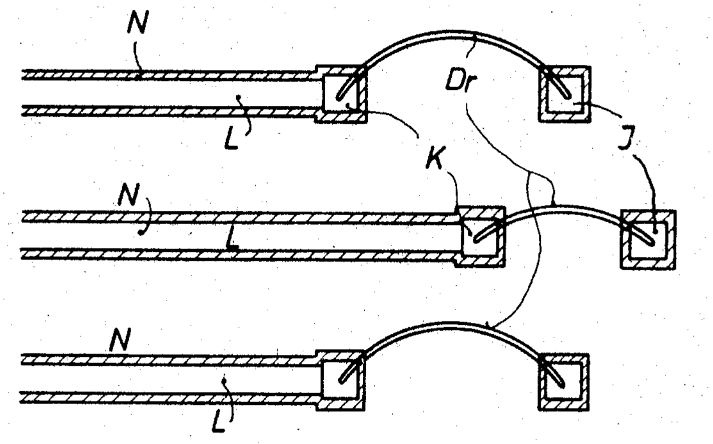

In order to connect the conductor paths L, for example, the X-, Y-, Z- and reading paths, with the electronic selection and excitation apparatus, it is efficacious to enlarge the grooves N in the semi-conductor material at the ends K and to cause conductor paths to terminate there in larger paths (FIG. 8). By the known (bonding) method, these areas K are connected with the semi-conductor islands I having, as is known, similar conductor paths (contacting islands) for contacting by means of wires *Dv* of aluminium, gold or the like.

It is efficacious to manufacture more storage elements and excitation elements than are required for replacing the elements which have proved unsatisfactory or are rejected in manufacture and after being tested. After the manufacture, the individual elements can be tested and upon contacting the defective elements can be replaced.

What is claimed is:

1. A method of manufacturing a magnetic storage matrix, comprising the steps of forming insulated islands of excitation elements at the edges of a wafer of semi-conductor material, providing a raster of grooves on the surface surrounded by said elements, applying an insulating layer on said surface including said grooves, coating said insulating layer with a first layer of magnetic material so that the inner area of said grooves are coated on all sides with a magnetic layer, applying a further insulating layer upon said magnetic layer, coating said further insulating layer with conducting paths in several layers alternating with additional insulating layers, and coating the final upper layer with a further magnetic material so as to contact said first magnetic layer and thereby form a closed magnetic loop around each of said grooves.

2. A method as claimed in claim 1 wherein said magnetic material is made of nickel-iron-cobalt alloys.

3. A method as claimed in claim 1 wherein said magnetic material is made of ferrite.

4. A method as claimed in claim 1 wherein said magnetic layers are deposited from the vapour phase in vacuo.

5. A method as claimed in claim 1 wherein masks are used in the manufacture of the magnetic layers or conductor paths or of the resistance paths.

6. A method as claimed in claim 1 wherein the grooves are enlarged at their ends.

7. A method as claimed in claim 1 wherein the conductor paths are widened at their ends.

8. A method as claimed in claim 7 wherein the enlarged areas of the conductor paths are connected through wires with the insulated islands.

9. A method as claimed in claim 1 wherein the step of providing a raster of grooves includes providing intersecting rectangular and diagonal grooves, and the width of the diagonal grooves is greater than that of the rectangular grooves.

10. A method as claimed in claim 1 wherein the storage elements are provided both at the crossings of two grooves and in the groove area between two crossings.

11. A method as claimed in claim 1 wherein a greater number of magnetic elements and of excitation elements is manufactured than is required, each element tested, and only faultless elements connected with each other.

12. A method of manufacturing a magnetic storage matrix comprising the steps of forming insulating islands of excitation elements around the perimeter of a wafer of semiconductor material, providing a raster of grooves on the inner surface portion surrounded by said elements, said grooves forming an array of mutual intersections over the inner surface area of the wafer, applying an insulating layer on said inner surface including the surfaces of said grooves, coating said layer with magnetic material so that the surface of the grooves is coated on all sides with the magnetic layer, applying a further insulating layer to said inner surface, including said grooves, coating said further insulating layer with conductor paths in several layers alternating with further insulating layers, coating the resultant upper layer with a further magnetic material so as to form a closed magnetic loop around each of the groove raster intersections, and connecting each termination of a groove conductor to an insulated island of excitation elements.

13. The method of claim 12 wherein said wafer is composed of silicon.

14. The method of claim 12 wherein all said insulating layers are composed of silicon.

15. The method of claim 12 wherein said conductor path includes resistive material and is provided by deposition from the vapor phase.

References Cited

UNITED STATES PATENTS

| | | | |
|---|---|---|---|
| 2,882,519 | 4/1959 | Walentine et al. | |
| 2,970,896 | 2/1961 | Cornelison et al. | |
| 3,005,937 | 10/1961 | Wallmark et al. | |
| 3,142,047 | 7/1964 | Henderson. | |
| 3,170,147 | 2/1965 | Bartik et al. | |
| 3,183,579 | 5/1965 | Briggs et al. | 29—604 |
| 3,213,430 | 10/1965 | ShintaroOshima et al. | |
| 3,229,266 | 1/1966 | Rajchman. | |
| 3,371,325 | 2/1968 | Hounsfield. | |
| 3,375,503 | 3/1968 | Bertelson. | |

OTHER REFERENCES

IBM Pub., vol. 6, No. 1, June 1963, p. 107, f by Felton and Hoffman.

CHARLIE T. MOON, Primary Examiner

R. W. CHURCH, Assistant Examiner

U.S. Cl. X.R.

29—625; 117—212; 340—174, 173; 317—235, 101; 174—68.5